(12) United States Patent
Huh

(10) Patent No.: US 8,149,738 B2
(45) Date of Patent: Apr. 3, 2012

(54) METHOD AND TERMINAL FOR ESTABLISHING PT SESSION IN ORDER TO USE PT BOX

(75) Inventor: Kang-Suk Huh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 11/797,043

(22) Filed: Apr. 30, 2007

(65) Prior Publication Data
US 2007/0258477 A1 Nov. 8, 2007

Related U.S. Application Data

(60) Provisional application No. 60/797,379, filed on May 4, 2006.

(30) Foreign Application Priority Data

Oct. 9, 2006 (KR) .................. 10-2006-0098154

(51) Int. Cl.
| | |
|---|---|
| H04L 12/16 | (2006.01) |
| H04Q 11/00 | (2006.01) |
| H04B 1/38 | (2006.01) |
| H04B 7/00 | (2006.01) |
| H04M 1/64 | (2006.01) |
| G06F 15/16 | (2006.01) |

(52) U.S. Cl. ....... 370/259; 370/271; 455/90.2; 455/518; 379/70; 379/88.22; 709/227

(58) Field of Classification Search .................. 370/389, 370/395.21, 395.3, 271, 381, 259; 455/518, 455/90.2; 709/227–228; 379/70, 88.22
See application file for complete search history.

(56) References Cited

U.S. PATENT DOCUMENTS

| | | | |
|---|---|---|---|
| 2002/0150091 A1 | 10/2002 | Lopponen et al. | |
| 2003/0012149 A1 | 1/2003 | Maggenti et al. | |
| 2004/0047303 A1 | 3/2004 | Fernandez et al. | |
| 2004/0057449 A1 | 3/2004 | Black | |
| 2004/0224710 A1* | 11/2004 | Koskelainen et al. | ........ 455/518 |

(Continued)

FOREIGN PATENT DOCUMENTS

KR 10-2006-0107987 A 10/2006
(Continued)

OTHER PUBLICATIONS

Comneon et al., "Push-to-talk over Cellular (PoC); Architecture; PoC Release 2.0", Architecture, V2.0.8, Jun. 2004, Technical Specification, pp. 1-49.

(Continued)

*Primary Examiner* — Alpus H Hsu
*Assistant Examiner* — Jeremy Costin
(74) *Attorney, Agent, or Firm* — Birch, Stewart, Kolasch & Birch, LLP

(57) ABSTRACT

A PT (Push-To) service among SIP based session services, and particularly, a method and terminal for establishing a PT session in order to allow a certain user to use a PT box service under control of a PT server in a SIP (Session Initiation Protocol) based service, are discussed. According to an embodiment, the method of providing a Push-To (PT) box service, includes storing, in a PT server, PT box setting information of a terminal; receiving, by the PT server, a session invitation directed to the terminal; and determining, by the PT server, a routing of the session invitation to a PT box for the terminal based on at least the PT box setting information.

13 Claims, 10 Drawing Sheets

U.S. PATENT DOCUMENTS

| | | | |
|---|---|---|---|
| 2004/0254998 A1* | 12/2004 | Horvitz | 709/206 |
| 2005/0154793 A1* | 7/2005 | Khartabil | 709/227 |
| 2006/0029189 A1* | 2/2006 | Patel et al. | 379/67.1 |
| 2006/0075095 A1* | 4/2006 | Horio et al. | 709/224 |
| 2006/0121923 A1* | 6/2006 | East | 455/518 |
| 2006/0148504 A1* | 7/2006 | Kim | 455/518 |
| 2006/0229095 A1* | 10/2006 | Sung et al. | 455/518 |
| 2007/0010275 A1* | 1/2007 | Kiss | 455/521 |
| 2007/0184867 A1* | 8/2007 | Son et al. | 455/518 |
| 2008/0248826 A1* | 10/2008 | Holm | 455/518 |

FOREIGN PATENT DOCUMENTS

| | | |
|---|---|---|
| RU | 2 367 115 C2 | 9/2009 |
| WO | WO-2004/075581 A1 | 9/2004 |
| WO | WO 2004/077796 A2 | 9/2004 |
| WO | WO2004075581 * | 9/2004 |
| WO | WO 2005/057895 A1 | 6/2005 |
| WO | WO 2006/019601 A1 | 2/2006 |
| WO | WO 2006/109971 A1 | 10/2006 |
| WO | WO2007045274 * | 4/2007 |

OTHER PUBLICATIONS

Open Mobile Alliance, "OMA-TS-PoC-ControlPlane-V1_0-20050805-C", OMA PoC Control Plane, Candidate Version 1.0, Aug. 5, 2005, pp. 1-282.

* cited by examiner

METHOD AND TERMINAL FOR ESTABLISHING PT SESSION IN ORDER TO USE PT BOX

This application claims the priority benefits of U.S. Provisional Application No. 60/797,379 filed on May 4, 2006, and Korean Patent Application No. 10-2006-0098154 filed on Oct. 9, 2006 in Republic of Korea. The entire contents of each of these applications are herein incorporated by reference.

BACKGROUND OF THE INVENTION

1. Field of the Invention

The present invention relates to a session based service, and more particularly, to a method and terminal for establishing a PT session in order to allow a certain user to use a PT box service under a control of a PT server in a SIP (Session Initiation Protocol) based service.

2. Discussion of the Related Art

In general, SIP denotes a signaling protocol which defines a procedure in which terminals desiring to communicate each other identify and find their locations, and establish or release (or change) multimedia service sessions therebetween. Services based on the SIP (i.e., SIP based services) have a request/response structure of controlling generation, modification and termination of multimedia service sessions. Also, the SIP based services provide services by using a SIP Uniform Resource Locator (URL), which is similar to an email address, without regard to IP (Internet Protocol) addresses so as to enable identification of each user.

A Push-To (PT) service may be one of the SIP based session services. The PT service is intended to provide rapid communications for service providers and mobile communication users. Also, the PT service is a type of half duplex communication service, namely, a communication service in which one client transmits media data (e.g., talk burst or media burst) to one or more other clients with which a session has been established. The PT service can typically be a Push-to-talk Over Cellular (PoC) service for transmission of voice (audio) data, a Push-To-View (PTV) service for transmission of moving picture (video) data, or a Push-To-Data (PTD) service for transmission of data.

The PT service provides a peer-to-peer (1-to-1) communication as well as a peer-to-group communication as in a group chat session (1-to-many), and uses a Session Initiation Protocol (SIP) to establish a session.

FIG. 1 is a signal flowchart illustrating a method for using a PT service according to a related art.

It is assumed in FIG. 1 that a PT client A equipped with a particular terminal (or PT User Equipment (UE)) denotes an entity for processing SIP messages, and messages shown in FIG. 1 are all SIP based messages.

In order to use the related art PT service, several preconditions first need to be satisfied, namely, the particular terminal should be registered in a SIP/IP core and a PT service setting should be done in a PT server.

As illustrated in FIG. 1, a PT client A 15 registers in a SIP/IP core A 20 (e.g., 3GPP IMS or 3GPP2 MMD) using a SIP REGISTER message (S1). The SIP/IP core A 20 sends a SIP 200 OK message to the PT client A 15 to inform that the PT client A 15 has successfully been registered in the SIP/IP core A 20 (S2).

The PT client A 15 delivers set values required for the PT service (i.e., PT service setting) to a PT server A 30 via the SIP/IP core A 20 by using a SIP PUBLISH message, where the PT service setting values include, for example, answer mode information, incoming session barring flag, instant personal alert barring flag, simultaneous support flag, etc. (S3 and S4). Here, the PT service setting values are delivered by being included in a body of the SIP PUBLISH message.

The PT server A 30 stores the PT service setting values therein (S5). The PT server A 30 also informs the PT client A 15, by using the SIP 200 OK message, that the PT service setting values have successfully been stored (S6 and S7). Here, in steps S6 and S7, the SIP 200 OK message is delivered from the PT server 30 to the PT client A 15 via the SIP/IP core A 20.

The aforementioned steps S1 and S2 are referred to as a 'registration' process, and steps S3 to S7 are referred to as a 'PT service setting'. Although there may be various PT services available, there is no PT box service available to the terminal according to the related art. Thus there is a need to provide a technique of providing a PT box service to the terminal. A PT box service would provide a media data box (PT box) to which media data (e.g., voice messages, images, data, etc.) directed to a user of the PT terminal can be forwarded and stored, e.g., when the user is not available, so that the user can later access the PT box to obtain the stored media data therefrom.

SUMMARY OF THE INVENTION

Therefore, the present invention provides a technique of providing a PT box service as part of PT services available to a terminal, thereby addressing the limitations and the needs associated with the related art.

It is an object of the present invention to provide a method and terminal for performing a PT service setting and establishing a PT session in a PT server to allow a particular terminal (or PT UE (User Equipment)) to use a PT box service in a SIP based PT service in a state that the particular terminal has been registered in a SIP/IP core.

It is another object of the present invention to provide a method, terminal and server for setting and utilizing PT box information to operate a PT box.

According to one aspect, the present invention provides a method of providing a Push-To (PT) box service, comprising: storing, in a PT server, PT box setting information of a terminal; receiving, by the PT server, a session invitation directed to the terminal; and determining, by the PT server, a routing of the session invitation to a PT box for the terminal based on at least the PT box setting information.

According to one aspect, the present invention provides a method for providing Push-To (PT) box setting information, comprising: obtaining, by a terminal, PT box setting information from a user input; generating, by the terminal, a SIP message including PT service setting information of the terminal, wherein the PT service setting information includes the PT box setting information to be used by a PT server to determine a routing of a session invitation; and transmitting, by the terminal, the generated SIP message to the PT server.

According to one aspect, the present invention provides a method of providing a Push-To (PT) box service, comprising: receiving, by a PT server, a parameter indicating PT box setting information of a first terminal; storing the received parameter in a storage accessible by the PT server; receiving, by the PT server, a PT session invitation directed to the first terminal from a second terminal; and checking the stored parameter after the PT session invitation directed to the first terminal is received by the PT server; and determining a routing of the PT session invitation based on at least the PT box setting information indicated by the parameter.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Hereinafter, constructions and operations in the preferred embodiments of the present invention will be explained with reference to the accompanying drawings.

In the present invention, first, when a counterpart terminal (or PT UE (User Equipment)) registers in a SIP/IP core and performs a 'PT service setting' in a PT server, it sets at least one or more information related to the use of a PT box (referred to as 'PT box setting information' hereafter) and stores the set information in the PT server. Second, when a particular terminal (source terminal or originating terminal) invites the counterpart terminal (target terminal or terminating terminal) to a PT session, the particular terminal establishes the PT session according to the PT box setting information related to the counterpart terminal set in the PT server, such that the session invitation can be selectively routed to the PT box of the counterpart terminal according to the PT box setting information. As a result, a user of the originating/source terminal can now leave media data in the PT box of the target terminal so that a user of the target terminal can access the stored media data by accessing the PT box.

The PT box in the present invention is for storing media data from any PT service(s) including, but not limited to, a Push-to-talk Over Cellular (PoC) service, a Push-To-View (PTV) service, a Push-To-Data (PTD) service, etc.

According to the present invention, to use the PT box service, the particular terminal should be a terminal which can use a PT box (i.e., has a PT box service capability) and a user of the particular terminal should have willingness (intention) to use the PT box. Also, PT box setting information related to the use of the PT box should preferably be preset in a PT server, where the PT box setting information includes preconditions and other conditions.

Figure 1:
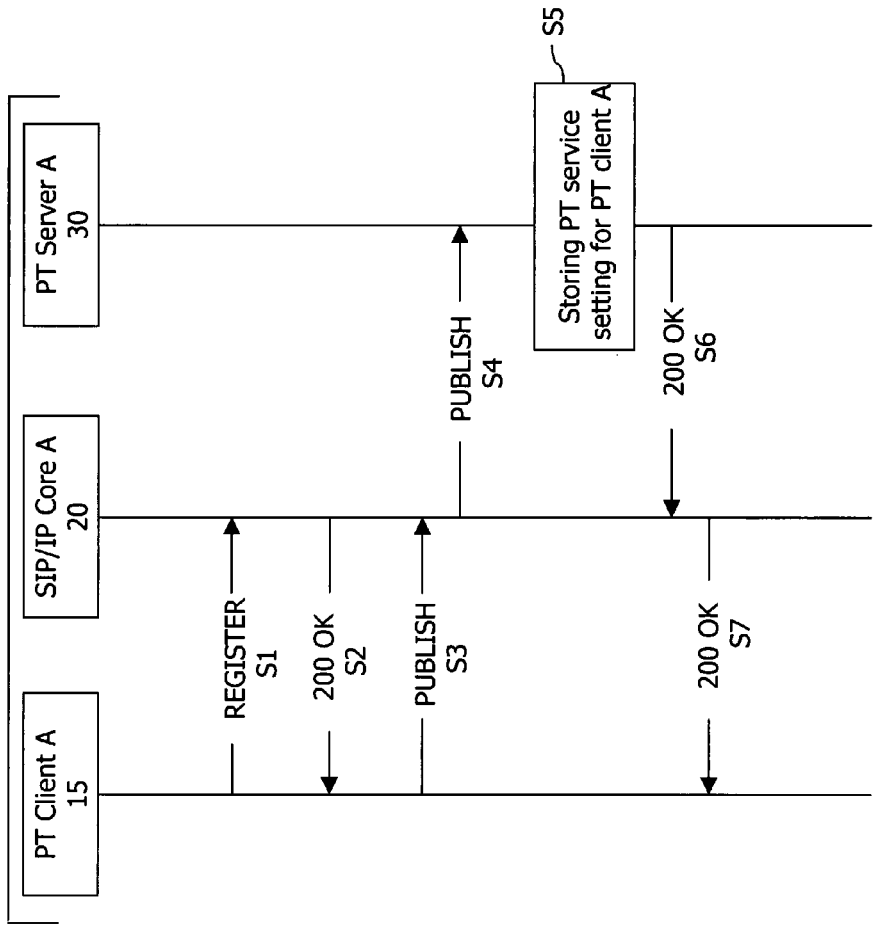
FIG. 1 is a signal flowchart illustrating a related art method for using a PT service.

According to an embodiment, the PT box setting information related to the particular terminal or intended by the user thereof is sent to the PT server by being included in a SIP PUBLISH message (e.g., by including the PT box setting information in the SIP PUBLISH message of steps S3 and S4 in FIG. 1). Here, the SIP PUBLISH message is sent from the particular terminal to the PT server via a SIP/IP CORE.

The preferred embodiments of the present invention embody PT session establishment methods in which a PT session invitation is allowed to be routed to a PT box depending on PT box setting information related to a particular terminal (i.e., target terminal) set in a PT server. Therefore, according to the present invention, the PT box setting information will be first described below and then different scenarios in a PT session establishment method in order to use a PT box according to the PT box setting information will be described.

A terminal (i.e., PT UE) according to the present invention, which is an entity performing PT service related functions, denotes any device having a PT client. Accordingly, the terminal according to the present invention may be one of all types of mobile communications terminals, PT service available notebooks, desktop computers, portable game devices, MPS, or other home appliances. Also, in the description of the present invention, a terminal (i.e., PT UE) preferably denotes a physical entity including a PT client, and the PT client preferably denotes a logical or physical entity included in the terminal. Accordingly, for the sake of the explanation of the present invention, the terminal may be referred to as the PT client or vice-versa.

A PT box for providing a PT box service according to the present invention can reside in the network (e.g., as part of a PT server or as another server or entity in the network) or can reside within the associated terminal/UE (e.g., PoC PT box). Preferably, here the PT box resides in the network.

Hereinafter, 'PT box setting information' used to operate a PT box is described according to the present invention.

The PT box setting information may include so-called (1) 'PT box capability', 'PT box willingness', and 'PT box conditionality'; or (2) 'PT box routing'.

The PT box setting information is described in more detail as follows.

The PT box setting information may include information indicating whether a PT UE is a terminal (i.e., PT UE) which is capable of using a PT box service. Such information (or parameter) is referred to as 'PT box capability', for the sake of explanation. If the PT UE is the terminal capable of using the PT box service, the information/parameter indicating the capability of the terminal is set as 'PT box capability[true]'.

Alternatively, if the PT UE is a terminal which is not capable of using the PT box service, the information/parameter indicating the capability of the terminal is set as 'PT box capability[false]'. Obviously, the parameter here can be set in other ways, e.g., as [0] or [1].

The PT box setting information may further include information indicating whether the user of the PT UE (or 'PT user') intends to route any received PT session invitation directed to the user to its PT box on behalf of the PT UE. Such information includes the PT user's willingness and thus is referred to as 'PT box willingness'. When the PT user is willing (intends) to route the PT session invitation to its PT box, the 'PT box willingness' information/parameter is set to 'PT box willingness[active]'. Conversely, when the PT user is not willing to route the user's PT session invitation to its PT box, the 'PT box willingness') information/parameter is set to 'PT box willingness[not active]'. The Parameter here can be set in other ways, e.g., as [0] or [1]. As a variation, because the PT box willingness information may become relevant only when the PT UE is capable of using the PT box, the PT box willingness information may be set only when the PT box capability information is set to 'true' (capable).

The PT box setting information may include additional information for notifying a target PT UE or target PT UE user as to whether to first perform a PT session invitation before routing to a PT box the PT session invitation sent to the target PT UE (i.e., PT client). Such information, which generally implies that the user is willing to use the PT box, is referred to as 'PT box conditionality' and indicates whether the routing of a PT session invitation to the PT box should be performed unconditionally or under certain condition(s). Here, the 'PT box conditionality' information may be available only when the 'PT box willingness' information is set to 'active'.

When the PT UE user is willing to unconditionally route the PT session invitation to its PT box, the 'PT box conditionality' information/parameter is set to 'PT box conditionality[unconditional]'. Conversely, when the PT UE user is willing to route the PT session invitation to its PT box under a certain condition, the 'PT box conditionality' information/parameter is set to 'PT box conditionality[conditional]'. The parameter here can be set in other ways, e.g., as [0] or [1].

The case where the 'PT box conditionality' information is set to 'conditional' (e.g., [active]) can correspond to either a case where a target PT UE can not accept the PT session invitation sent thereto or a case where the PT UE user does not accept the PT session invitation. In this case, a PT session is established such that the PT session invitation toward the target PT UE is routed to the PT box.

Hereinafter, as the case where the 'PT box conditionality' information is set to 'conditional', e.g., either the case where a target PT UE can not accept the PT session invitation sent thereto or the case where the target PT UE user does not accept the PT session invitation, four exemplary cases therefor are provided as follows.

The first case is that the PT server does not receive a ringing response from the target PT client for a certain time (e.g., a preset time) after sending the PT session invitation to the target PT client in case of a manual answer mode.

The second case is that the PT server does not receive an accept or reject response with respect to the PT session invitation from the target PT client for a certain time (e.g., a preset time) after receiving the ringing response from the target PT client in case of a manual answer mode.

The third case is that the PT server does not receive an accept or reject response with respect to the PT session invitation from the target PT client for a certain time (e.g., a preset time) after sending the PT session invitation to the target PT client in case of an automatic answer mode.

The fourth case is that the target PT client has already been participating in one or plural other PT sessions and the target PT client does not support simultaneous PT sessions.

As mentioned above, if the PT server receives a PT session invitation with respect to a target PT client in a state that the 'PT box conditionality' for the target PT client is set to 'conditional', the PT server routes the PT session invitation to the PT box of the target PT client, in case of any one of the above described four exemplary cases. That is, the above described four exemplary cases can be considered conditions, which if occurred would cause the PT server to route the PT session invitation to the appropriate PT box since the 'PT box conditionality' is set to 'PT box conditionality[conditional]'.

As such, the described PT box setting information (i.e., 'PT box capability', 'PT box willingness' and 'PT box conditionality') can be represented with parameters or elements, each thusly having one of two possible set values (e.g., 'true/false' or 'active/not active').

Alternatively, just a single parameter can indicate all information to be represented with the three parameters. This parameter or information is referred to as 'PT box routing' information for the sake of explanation.

Hereinafter, 'PT box routing' information/parameter is described as one example of the PT box setting information according to a preferred embodiment of the present invention.

The 'PT box routing' information is a parameter or element which has three possible set values. For the sake of explanation, the three possible values for the PT box routing information/parameter are 'PT box routing[1]', 'PT box routing[2]' and 'PT box routing[3]' in order to discriminate the 'PT box routing' information according to the three possible values. Although the values 1, 2 and 3 are used, the present invention is not limited thereto and other possible values for the PT box routing parameter may be used. The setting of the 'PT box routing' with one of the three different values can be represented by a conventional boolean algebra. Accordingly, the details related to this will not be described here.

Hereinafter, a detailed explanation will be given of what each of the three possible values of the 'PT box routing' information represents.

More specifically, the PT box routing information can represent the following:
PT box routing[1]: unwilling,
PT box routing[2]: unconditional, or
PT box routing[3]: conditional.
In this example, the 'PT box routing' has one of the three possible values [1], [2] and [3] respectively representing 'unwilling', 'unconditional' and 'conditional'. However, the present invention is not limited thereto and other values may be used to as desired.

The 'PT box routing[1]' indicates that the PT UE user is not willing to use the PT box service. That is, the 'PT box routing [1]' can be viewed to be the same as the case of 'PT box willingness[not active]'. If 'PT box routing[1]' is indicated, then the PT server does not route the PT session invitation (i.e., a PT session invitation message sent from a particular client to a target PT client) to the PT box of the target PT client (or PT UE user).

The 'PT box routing[2]' indicates that the PT UE user is willing to use the PT box service and the PT session invitation for inviting the target PT client should be unconditionally routed to the PT box of the target PT client. That is, the 'PT box routing[2]' can be viewed to be the same as a case where the 'PT box willingness' is set to 'active' and simultaneously the 'PT box conditionality' is set to 'unconditional'.

The 'PT box routing[3]' indicates that the PT UE user is willing to use the PT box service but the PT session invitation to invite the target PT client should be routed to the PT box of the target PT client only under certain condition(s). Thus 'PT box routing[3]' can be viewed to be the same as a case where the 'PT box willingness' is set to 'active' and simultaneously the 'PT box capability' is set to 'conditional'. Here, the certain condition (which triggers the routing of the session invitation to the PT box) can be a situation where the target PT client can not accept the PT session invitation or a user of the target PT UE does not accept the PT session invitation. One or more of the four exemplary cases described above can be such certain condition(s).

The PT server or the manufacturer of the terminal can set in advance which condition(s) will trigger the routing of the session invitation to the PT box, when the PT box routing parameter is set to 'PT box routing[3]' or 'PT box capability' is set to 'conditional'. The terminal can also provide menu items in a menu that list one or more conditions(s) that can trigger the routing of the session invitation to the PT box of the terminal, and the user can select/click one or more such menu items to set the user's preferred conditions that will trigger the routing.

As such, according to an embodiment of the present invention, a particular terminal (or PT client) presets its PT box setting information in a PT server, e.g., via a SIP PUBLISH message, when performing a PT service setting operation. That is, in the present invention, the PT box setting information (e.g., 'PT box routing' parameter) can be included in the SIP PUBLISH message (or other message) that is generally sent from a PT client to a PT server in the PT service setting operation discussed in steps S3 and S4 of FIG. 1. Afterwards, when another terminal (i.e., source terminal or originating terminal) invites the particular terminal (i.e., target terminal or terminating terminal) to a PT session, the PT session is established such that the another terminal can use a PT box of the particular terminal according to the PT box setting information already preset by the particular terminal (i.e., target terminal or terminating terminal).

Hereinafter, a PT session establishment method in which a PT session invitation is allowed to be routed to a PT box depending on PT box setting information preset (stored) in a PT server according to the present invention will be described with reference to FIGS. 2 to 10. In the examples of FIGS. 2 to 10, it is assumed that a PT client B 40 is a target PT client and a PT server 30 has already stored PT box setting information related to the PT client B 40 in the storage of the PT server 30 or a storage accessible by the PT server 30. Also, it is assumed that a PT client A 10 (source terminal requesting a session invitation with the target PT client 40) and the PT client B 40 have been registered in a SIP/IP CORE 20. A PT box 50 for the PT client B 40 preferably resides in the network, but can reside in the PT client B 40. Meanwhile, in FIGS. 2 to 10, components or signal flows having the same reference numerals have the same or similar functions and operations.

Figure 2:
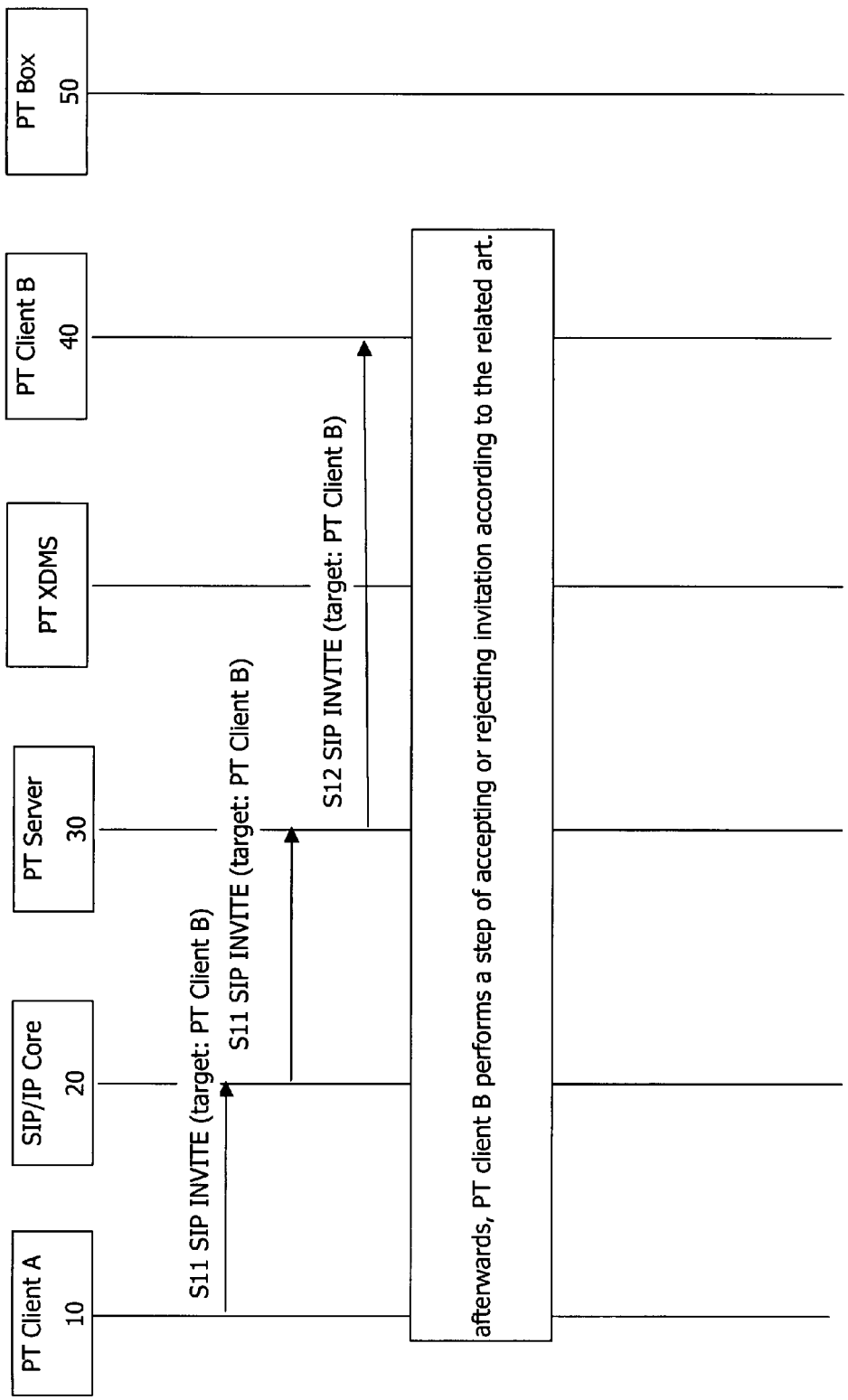
FIG. 2 is a signal flowchart illustrating one example of a method for establishing a PT session in order to use a PT box in case of PT box routing information[1] in accordance with an embodiment of the present invention.

FIG. 2 is a signal flowchart illustrating one example of a method for establishing a PT session in order to use a PT box in a case where PT box capability is set to 'false' or in a case where 'PT box routing' information is set to 'PT box routing [1]' according to an embodiment of the present invention. In case of PT box capability[false], there is generally no need to check 'PT box willingness' information and 'PT box conditionality' information.

Referring to FIG. 2, when the PT client A 10 sends a PT session invitation message (e.g., SIP INVITE) to the PT client B 40, the PT server 30 receives the PT session invitation message(S11). In this step S11, the PT session invitation message (i.e., SIP INVITE) is sent via the SIP/IP CORE 20.

Then the PT server 30 checks the PT box setting information related to the PT client B 40 stored in its certain memory or a certain entity. Here, since 'PT box capability' set to 'false' or 'PT box routing[1]' ('PT box routing' set to 'unwilling'), then the PT session invitation (SIP INVITE message) from the PT client A 10 is not routed to a PT box 50 assigned to the PT client B 40. That is, depending on the PT box setting information pertaining to the PT client B, the PT server 30 determines whether or not to route the session invitation to the PT box 50 of the PT client B.

Therefore, based on the PT box setting information pertaining to the PT client B, the PT server 30 determines not to route the session invitation to the PT box 50 and sends the PT session invitation (i.e., SIP INVITE) to the PT client B 40. The PT client B 40 then accepts or rejects the invitation (S12). The steps after step S12 are the same as those in the related art. Accordingly, the detailed explanation therefor will not be repeated.

Figure 3:
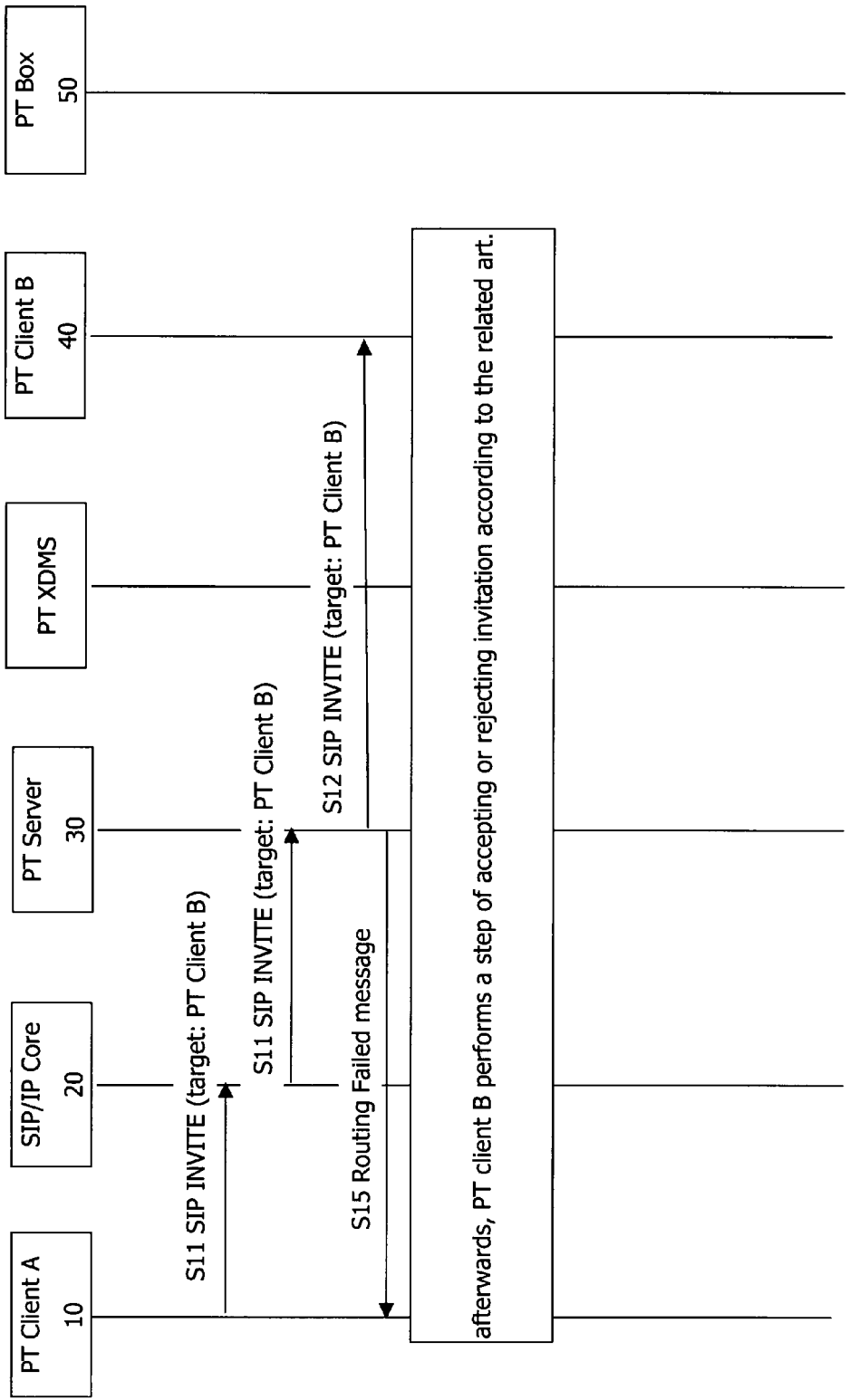
FIG. 3 is a signal flowchart illustrating another example of a method for establishing a PT session using a PT box in case of PT box routing information[1] in accordance with an embodiment of the present invention.

FIG. 3 is a signal flowchart illustrating another example of a method for establishing a PT session using a PT box in a case where 'PT box capability' is set to 'true' and 'PT box willingness' is set to 'not active' in PT box setting information, or in a case where 'PT box routing' information is set to 'PT box routing[1]', in accordance with an embodiment of the present invention. Here, steps S11 and S12 in FIG. 3 are the same as steps S11 and S12 in FIG. 2.

Referring to FIG. 3, when the PT client A 10 sends a PT session invitation message (e.g., SIP INVITE) toward the PT client B 40, the PT server 30 receives the PT session invitation message through the SIP/IP core 20 (S11). The PT server 30 checks (or analyzes) PT box setting information regarding the PT client B 40 stored in a memory of the PT server 30 or in other storage unit. In this example, the PT box setting information regarding the PT client B 40 includes 'PT box capability' set to 'true' but 'PT box willingness' set to 'not active', or the PT box setting information regarding the PT client 40 includes 'PT box routing[1]'. That is, the PT client B 40 may support a PT box service but the PT UE B user (i.e., a user of the PT client B 40) is not willing (or is unwilling) to route the PT session invitation to the PT box 50 of the PT client B. Therefore, based on the PT box setting information of the PT client B, the PT server 30 determines that the PT session invitation from the PT client A 10 is not to be routed to the PT box 50 of the PT client B 40. For instance, if the PT server 30 determines that the session invitation is not to be routed to the PT box 50 because the parameter (e.g., 'PT box routing') indicates 'unwilling' (but capable), then the PT server 30 sends a message indicating that the routing of the session invitation to the PT box 50 has failed or did not occur, to the PT client A 10 (S15). In this regard, a message such as a SIP 480 ("Temporarily unavailable") response message can be sent from the PT server 30 to the PT client A 10 in step S15. Step S15 can occur before or after step S12 or at the same time as step S12. Also, when the 'PT box capability' is set to 'true' and the 'PT box willingness' is set to 'not active', the PT server 30 may not need to consider 'PT box conditionality' information. Once the PT server 30 determines that the session invitation is not to be routed to the PT box 50 based on the PT box setting information regarding the PT client B, the PT server 30 sends the PT session invitation message (e.g., SIP INVITE) to the PT client B 40, and the PT client B 40 then accepts or rejects the invitation (S12). The steps following step S12 are the same as those in the related art. Accordingly, the detailed explanation thereof will not be repeated.

Figure 4:
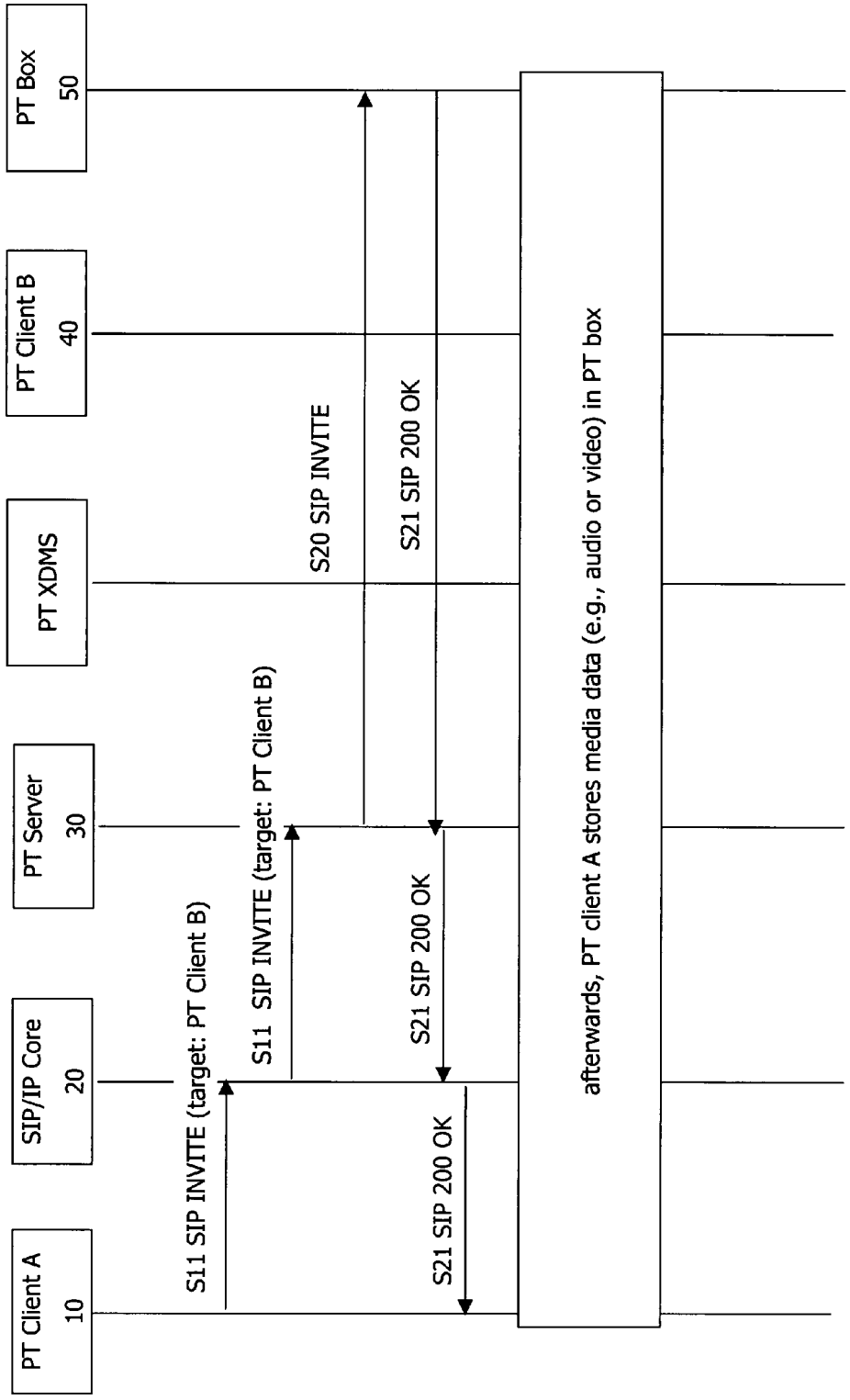
FIG. 4 is a signal flowchart illustrating one example of a method for establishing a PT session using a PT box in case of PT box routing information[2] in accordance with an embodiment of the present invention.

FIG. 4 is a signal flowchart illustrating a method for establishing a PT session using a PT box in a case where 'PT box capability' is set to 'true', 'PT box willingness' is set to 'active' and 'PT box conditionality' is set to 'unconditional' in PT box setting information, or in a case where 'PT box routing' information is set to 'PT box routing[2]', in accordance with an embodiment of the present invention.

Referring to FIG. 4, the PT server 30 receives a PT session invitation message (e.g., SIP INVITE) directed to the PT client B 40 (S11), and checks the prestored PT box setting information of the PT client B 40. In this example, the PT box setting information related to the PT client B 40 includes either 'PT box capability[true], 'PT box willingness[active] and 'PT box conditionality[unconditional], or 'PT box routing[2]' ('PT box routing' set to 'unconditional'). Based on such PT box setting information, the PT server 30 does not send the PT session invitation to the PT client B 40, but unconditionally sends the PT session invitation message (i.e., SIP INVITE) to the PT box 50 of the PT client B 40 (S20). That is, the PT server 30 routes the PT session invitation to the PT box 50 of the PT client B, unconditionally.

The PT box 50 then sends a PT session invitation response message (e.g., SIP 200 OK) to the PT server 30 in response to the PT session invitation message (i.e., SIP INVITE) (S21). The PT server 30 then sends the PT session invitation response message (i.e., SIP 200 OK) to the PT client A 10 via the SIP/IP CORE 20 (S21).

After establishing the PT session between the PT client A 10 and the PT box 50 through steps S20 and S21, the PT client A 10 can store media data (e.g., audio, video, etc.) in the PT box 50 of the PT client B 40 for the user of the PT client B 40 to access subsequently. That is, the user of the PT client A can now leave media data (like leaving a voice message in a voice mail box) in the PT box 50 of the PT client B, so the user of the PT client B can retrieve it from the PT box 50 at any desired time.

Hereinafter, FIG. 5 through FIG. 10 according to the present invention will be described. FIGS. 5 to 10 are signal flowcharts respectively illustrating six different examples of a method for establishing a PT session using a PT box in a case where 'PT box capability' is set to 'true', 'PT box willingness' is set to 'active' and 'PT box conditionality' is set to 'conditional' in PT box setting information, or in a case where 'PT box routing' information is set to 'PT box routing[3]' ('PT box routing' set to 'conditional'), according to an embodiment of the present invention. In the examples of FIGS. 5 to 10, since the 'PT box conditionality' or 'PT box routing' is set to 'conditional', routing of a PT session invitation to the PT box 50 may occur if at least one preset certain condition occurs. Here, the preset certain condition(s) may be that the PT client B 40 can not accept the PT session invitation or a user of the PT UE B (i.e., the user of the PT client B 40) does not accept the PT session invitation. Six examples of such preset certain conditions are described as follows referring to FIGS. 5 through 10.

Figure 5:
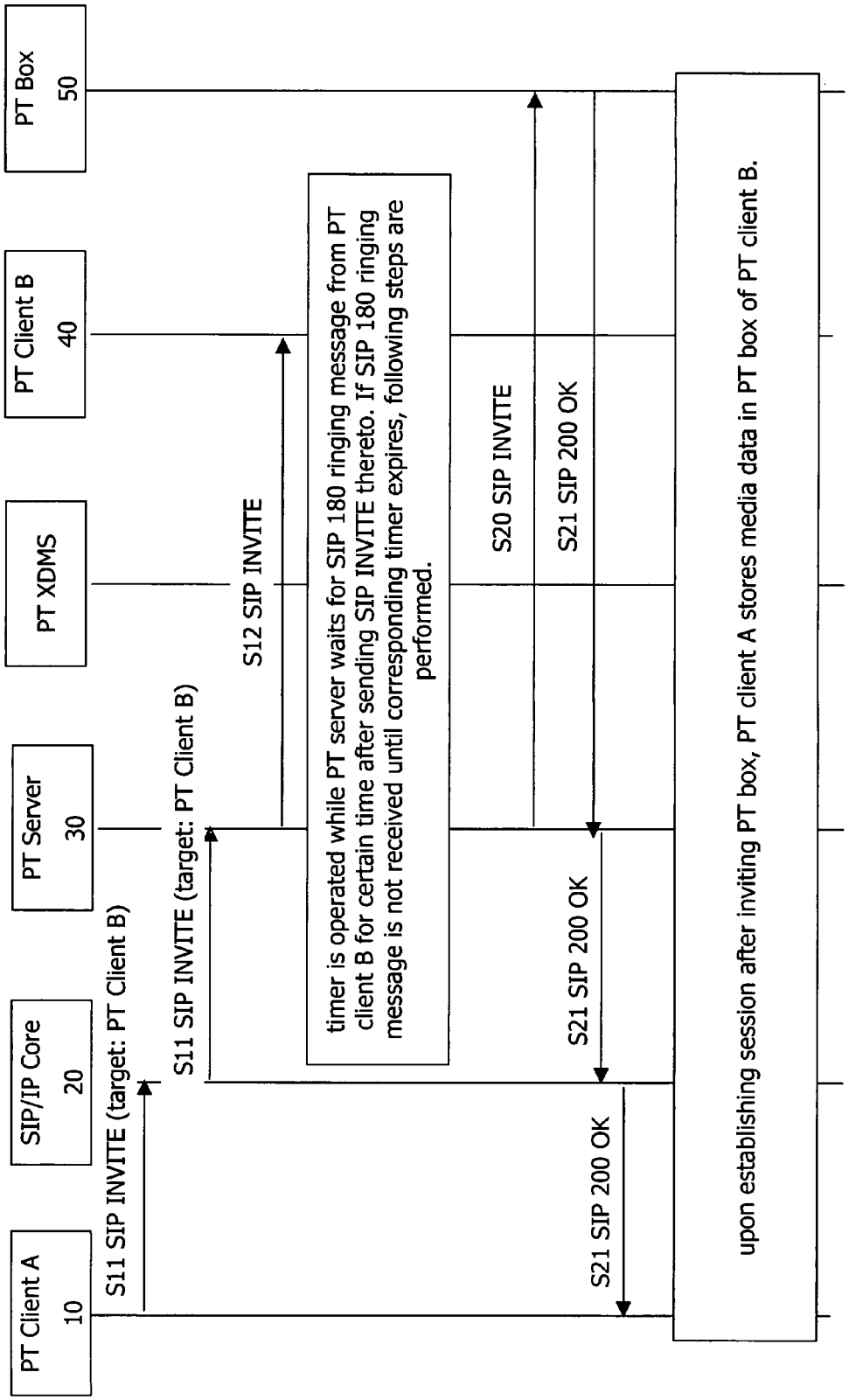
FIG. 5 is a signal flowchart illustrating a first example of a method for establishing a PT session using a PT box in case of PT box routing information[3] in accordance with an embodiment of the present invention.

In the first example of FIG. 5, if the PT server 30 does not receive a ringing response from the PT client B 40 for a certain time (e.g., a preset time) after sending the PT session invitation to the PT client B 40 in case where the PT client B 40 is in a manual answer mode, the PT server 30 routes the PT session invitation to the PT box 50 of the PT client B.

Referring to FIG. 5, the PT server 30 receives a PT session invitation message (e.g., SIP INVITE) with respect to the PT client B 40 (S11), and checks the PT box setting information regarding the PT client B 40. Here, since 'PT box conditionality' or 'PT box routing' is set to 'conditional' in the PT box setting information related to the PT client B 40, the PT server 30 sends the PT session invitation message (e.g., SIP INVITE) to the PT client B 40 (S12).

The PT server 30 waits for a ringing response (e.g., SIP 180 ringing message) from the PT client B 40 for a certain time. Here, the certain time can be a time set in a particular timer of the PT server 30, and the particular timer is operated to check whether a ringing response is received from the PT client B 40 for its set time.

If the PT server 30 does not receive the ringing response (e.g., SIP 180 ringing message) from the PT client B 40 for the certain time, the PT server 30 sends the PT session invitation message (i.e., SIP INVITE) to the PT box 50 of the PT client B 40 (S20). The PT box 50 then sends a PT session invitation response message (e.g., SIP 200 OK) to the PT server 30 in response to the received PT session invitation message (i.e., SIP INVITE). The PT server 30 accordingly sends the PT session invitation response message (i.e., SIP 200 OK) to the PT client A 10 via the SIP/IP CORE 20 (S21). Through steps S20 and S21, the PT session is established between the PT client A 10 and the PT box 50, and through the established PT session, the PT client A 10 (e.g., user of the PT client A) can store media data (e.g., audio, video, etc.) in the PT box 50 of the PT client B 40 for the user of the PT client B 40 to access subsequently.

Figure 6:
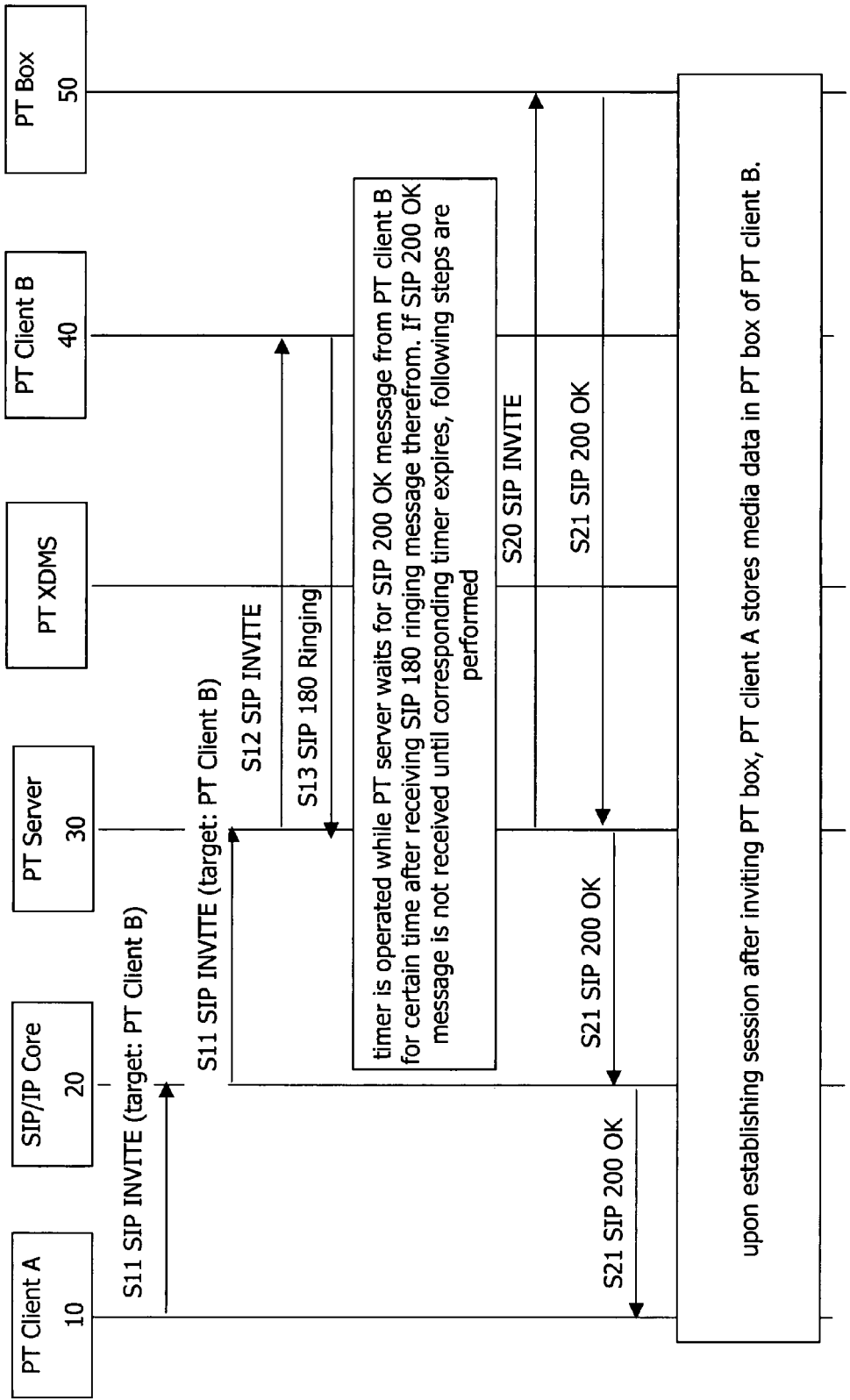
FIG. 6 is a signal flowchart illustrating a second example of a method for establishing a PT session using a PT box in case of PT box routing information[3] in accordance with an embodiment of the present invention.

In the second example of FIG. 6, if the PT server 30 does not receive a PT session invitation response message (e.g., SIP 200 OK or SIP 4XX OK) from the PT client B 40 for a certain time (e.g., a preset period designated by a particular timer) after receiving the ringing response (e.g., SIP 180 ringing) from the PT client B 40 in case of a manual answer mode of the PT client B 40, then the PT server 30 routes the PT session invitation to the PT box 50 of the PT client B. Referring to FIG. 6, steps S11 and S12 (same as those in FIG. 5) are performed. After completing steps S11 and S12, the PT server 30 receives a ringing response (e.g., SIP 180 ringing) from the PT client B 40 (S13), and then waits for the PT session invitation response message (e.g., SIP 200 OK or SIP 4XX OK) from the PT client B 40 for a certain time. If the PT server 30 does not receive the PT session invitation response message from the PT client B 40 for the certain time, steps S20 and S21 and the subsequent steps of storing media data as illustrated in the example of FIG. 5 are performed in FIG. 6. Through steps S20 and S21, the PT session is established between the PT client A 10 and the PT box 50, and through the established PT session, the PT client A 10 can store media data (e.g., audio, video, etc.) in the PT box 50 of the PT client B 40 for the user of the PT client B 40 to access later.

Figure 7:
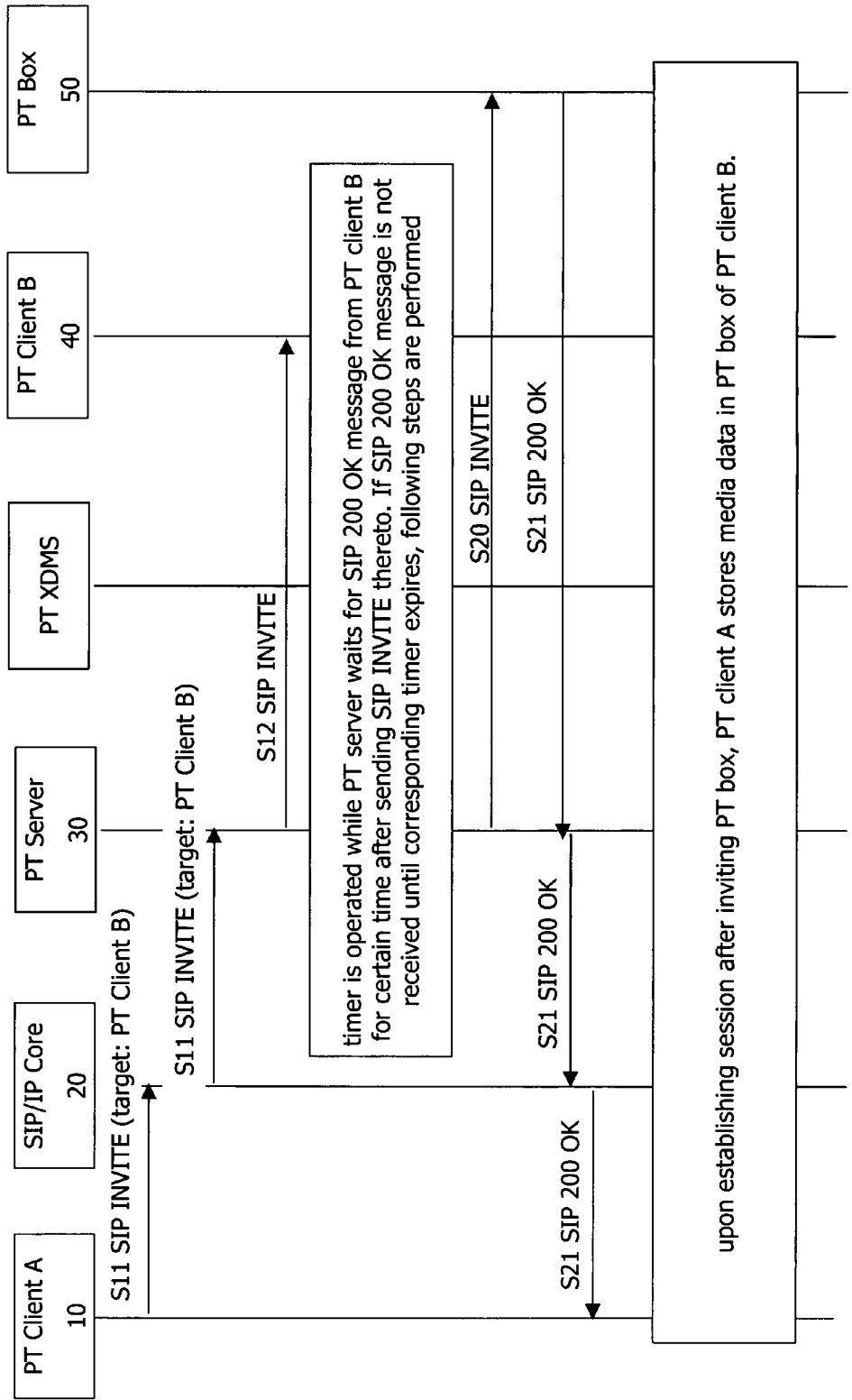
FIG. 7 is a signal flowchart illustrating a third example of a method for establishing a PT session using a PT box in case of PT box routing information[3] in accordance with an embodiment of the present invention.

In the third example of FIG. 7, if the PT server 30 does not receive a PT session invitation response message (e.g., SIP 200 OK) from the PT client B 40 for a certain time (e.g., a preset time counted by a timer) after sending the PT session invitation message (e.g., SIP INVITE) to the PT client B 40 in case of an automatic answer mode of the PT client B 40, then the PT server 30 routes the PT session invitation to the PT box 50 of the PT client B. Referring to FIG. 7, the PT client A 10 sends a PT session invitation message directed to the PT client B 40 (e.g., SIP INVITE) to the PT server 30 through the SIP/IP core 20 (S11). The PT server 30 sends the PT session invitation message (i.e. SIP INVITE) to the PT client B 40 (S12), and waits for a PT session invitation response message (e.g., SIP 200 OK) from the PT client B 40 for a certain time (e.g., a time counted by a particular timer).

Here, if the PT server 30 does not receive the PT session invitation response message (e.g., SIP 200 OK) from the PT client B 40 for the certain time, steps S20 and S21 and the subsequent steps of storing media data in the PT box 50 as illustrated in the examples of FIGS. 5 and 6 are performed.

Through steps S20 and S21, when the PT session is established between the PT client A 10 and the PT box 50, the PT client A 10 can store media data (e.g., audio, video, etc.) in the PT box 50 of the PT client B 40 for the user of the PT client B 40 to access at a later time.

Figure 8:
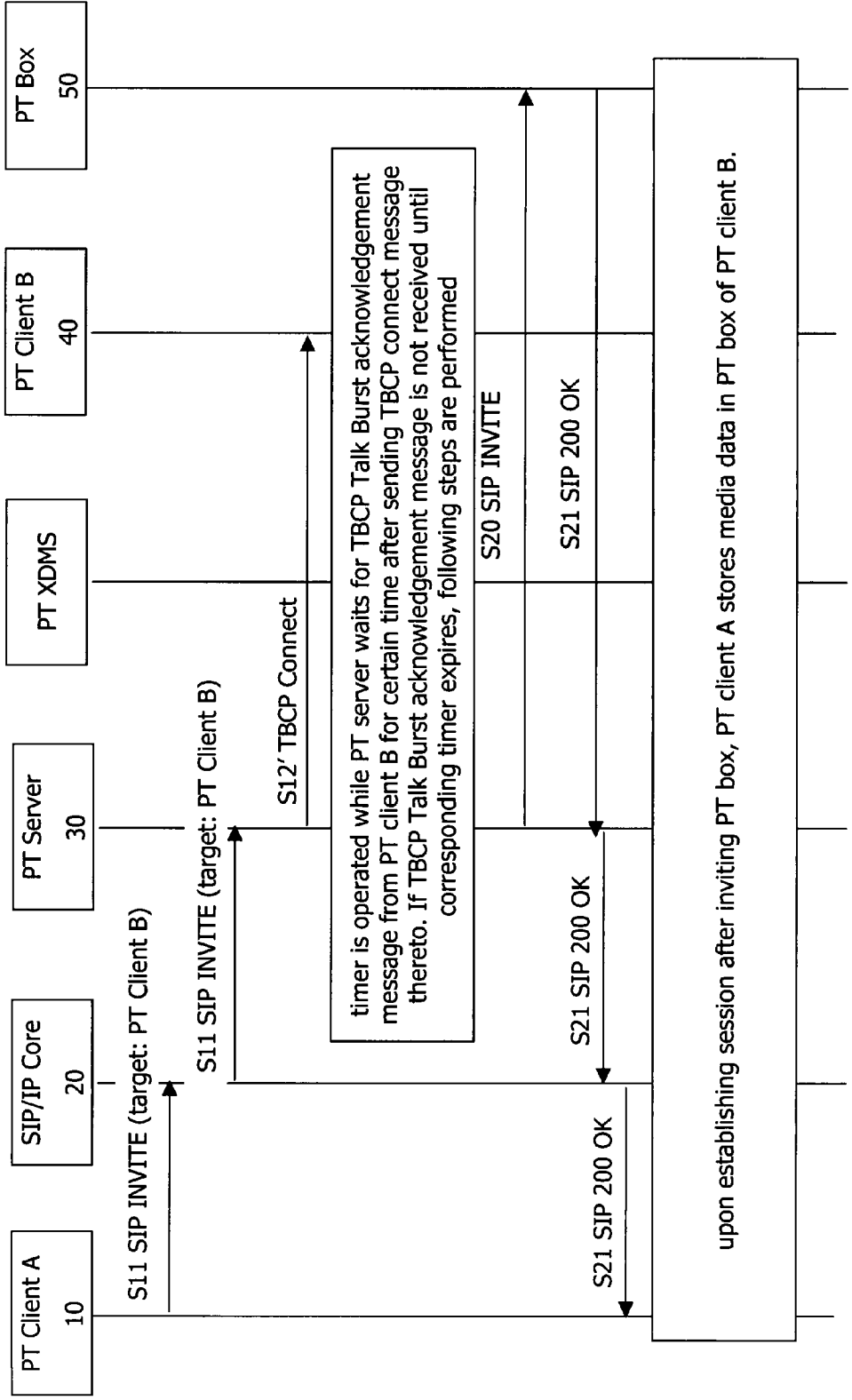
FIG. 8 is a signal flowchart illustrating a fourth example of a method for establishing a PT session using a PT box in case of PT box routing information[3] in accordance with an embodiment of the present invention.

In the fourth example of FIG. 8, if the PT server 30 does not receive an acknowledgement message (e.g., TBCP Talk Burst acknowledgement or MBCP Media Bust acknowledgement) from the PT client B 40 for a certain time (e.g., a time counted by a particular timer) after the PT server 30 has sent a TBCP (or MBCP) connection message to the PT client B in an automatic answer mode of a pre-established session or when the session is already established between the PT server 30 and the PT client B, then the PT server 30 routes the PT session invitation to the PT box 50 of the PT client B. Here, TBCP stands for Talk Burst Control Protocol, and MBCP stands for Media Burst Control Protocol.

Comparing the example of FIG. 7 with the example of FIG. 8, steps are generally the same, except for step S12' which is different from step S12 of FIG. 7. Therefore, only the particular step (S12') is described in the example of FIG. 8 and other steps will be understood by the description of the steps of FIG. 7 given above.

Referring to FIG. 8, here a session between the PT server 30 and the PT client B is already established. Then step S11 is performed. The PT server 30 sends a TBCP (Talk Burst Control Protocol) connect message (or a MBCP connect message) to the PT client B 40 (S12'). If the PT server 30 does not receive an acknowledgement message (e.g., TBCP Talk Burst Acknowledgement or MBCP Media Burst Acknowledgement) from the PT client B 40 for a certain time (e.g., a time counted by a particular timer), steps S20 and S21 and the subsequent steps of storing media data as illustrated in the examples of FIGS. 5-7 are performed. Through steps S20 and S21, when the PT session is established between the PT client A 10 and the PT box 50, the PT client A 10 can store media data (e.g., audio, video, etc.) in the PT box 50 of the PT client B 40 for the user of the PT client B 40.

Figure 9:
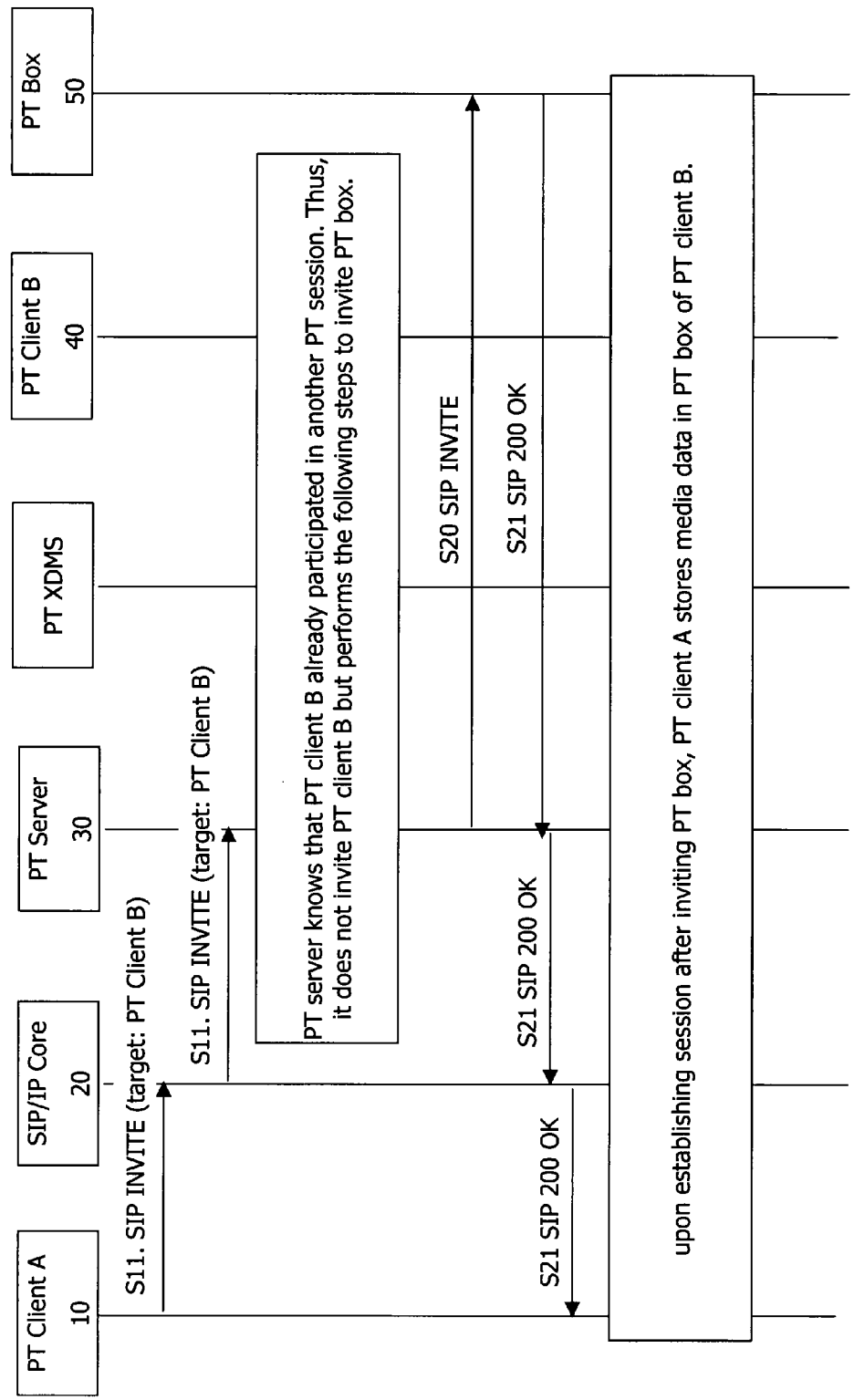
FIG. 9 is a signal flowchart illustrating a fifth example of a method for establishing a PT session using a PT box in case of PT box routing information[3] in accordance with an embodiment of the present invention.

In the fifth example of FIG. 9, the PT server 30 establishes a PT session between the PT client A 10 and the PT box 50 by allowing the PT session invitation to be routed to the PT box 50 when the PT client B 40 has already been participating in another PT session and the PT client B 40 does not support simultaneous PT sessions.

Referring to FIG. 9, the PT server 30 receives a PT session invitation message (e.g., SIP INVITE) with respect to the PT client B 40 from the PT client A 10 (S11). Here, the PT session invitation message (i.e., SIP INVITE) is sent via the SIP/IP CORE 20.

After recognizing that the PT client B 40 has currently participated in another PT session, the PT server 30 checks the PT box setting information pertaining to the PT client B 40. The PT server 30 identifies that the 'PT box conditionality' or 'PT box routing' is set to 'conditional' in the PT box setting information pertaining to the PT client B 40. The PT server 30 also recognizes that the PT client B does not support simultaneous PT sessions. That is, because of the condition that the PT client B does not support simultaneous PT sessions and the PT client B has already participated in another PT session, according to the PT box setting information the PT server 30 determines to route the session invitation from the PT client A 10 to the PT box 50. As a result, steps S20 and S21 and the subsequent steps of storing media data in the PT box 50 as illustrated in the examples of FIGS. 5-7 are performed. Through steps S20 and S21, when the PT session is established between the PT client A 10 and the PT box 50, the PT client A 10 can store media data (e.g., audio, video, etc.) in the PT box 50 of the PT client B 40 for the user of the PT client B 40.

Figure 10:
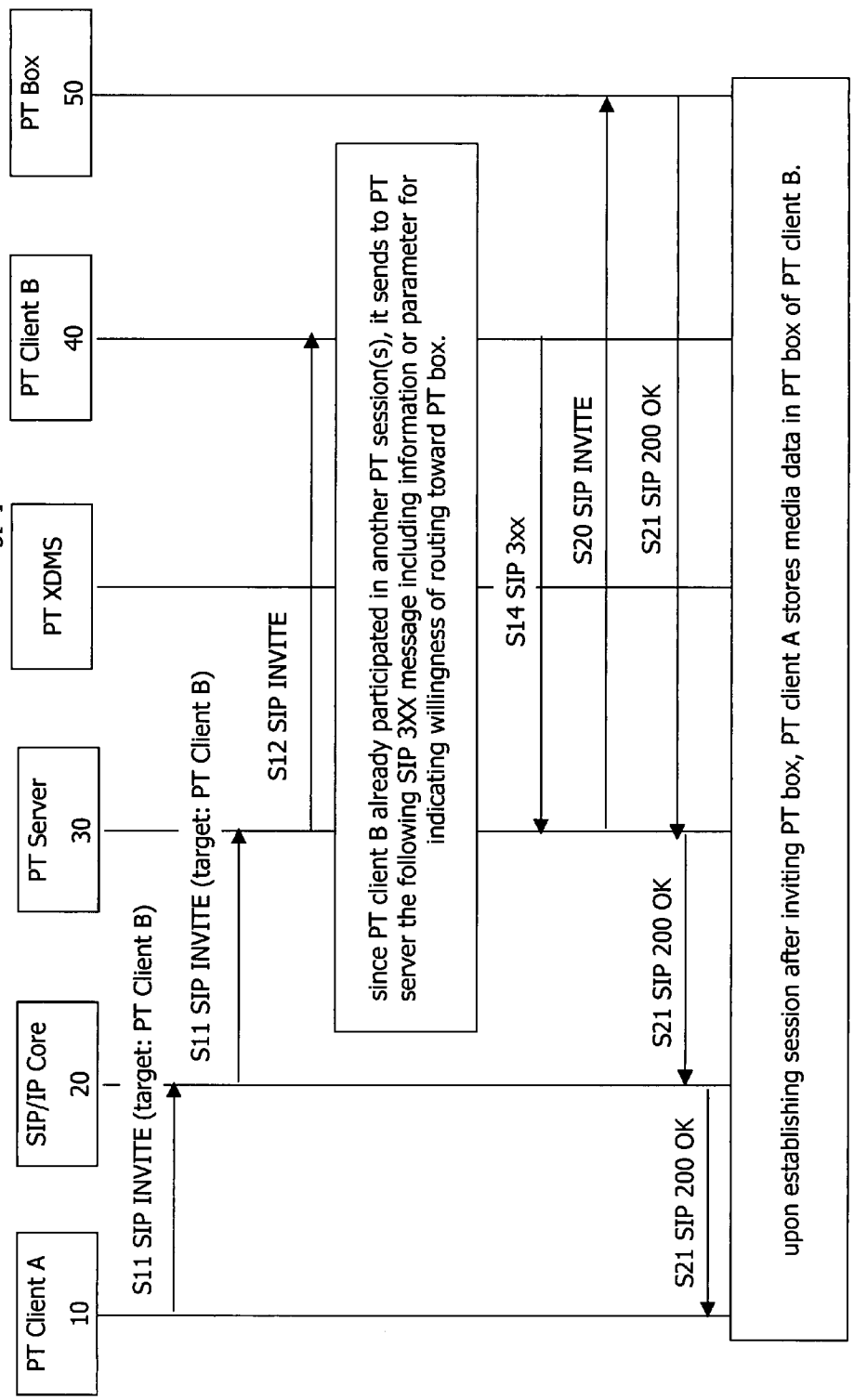
FIG. 10 is a signal flowchart illustrating a sixth example of a method for establishing a PT session using a PT box in case of PT box routing information[3] in accordance with an embodiment of the present invention.

In the six example of FIG. 10, the PT client B 40 has already been participating in another PT session similar to the example of FIG. 9. However, in the example of FIG. 10, the PT server 30 does not immediately and automatically route the PT session invitation to the PT box 50 as in FIG. 9, but instead the PT client B 40 can decide whether the routing toward the PT box 50 is desired, and the PT server 30 routes the PT session invitation to the PT box 50 if the PT server 30 receives a message indicating that the routing is desired from the PT client B.

Referring to FIG. 10, the PT sever 30 receives a PT session invitation message (e.g., SIP INVITE) with respect to the PT client B 40 from the PT client A 10 (S11). Here, the PT session invitation message (i.e., SIP INVITE) is sent via the SIP/IP CORE 20.

The PT server 30 checks the PT box setting information regarding the PT client B 40 and recognizes that the 'PT box conditionality' or 'PT box routing' is set to 'conditional' in the PT box setting information regarding the PT client B 40. The PT server 30 then sends the PT session invitation message (i.e., SIP INVITE) to the PT client B 40 (S12).

The PT client B 40 has currently participated in another PT session, and accordingly it requests the PT server 30 to establish a PT session by allowing the PT session invitation to be routed to the PT box 50. That is, when the PT client B receives the session invitation from the PT server 30, the PT client B 40 sends a response message (e.g., SIP 3XX such as a SIP 300 message) including information or parameter indicating that the PT client B desires the PT session invitation from the PT client A 10 to be routed to the PT box 50 (S14). If the routing is not desired, the PT client B can send the response message that indicates this unwilling to the PT server 30 in step S14, in which case the PT server 30 does not route the session invitation to the PT box 50.

When the PT server 30 receives the message (i.e., SIP 3XX) and determines that the PT client B desires the routing of the PT session invitation to the PT box 50, then based on the PT box setting information, steps S20 and S21 and the subsequent step(s) of routing the session invitation to the PT box 50 as illustrated in the examples of FIGS. 5-9 are performed. Through steps S20 and S21, when the PT session is established between the PT client A 10 and the PT box 50, the PT client A 10 can store media data (e.g., audio, video, etc.) in the PT box 50 of the PT client B 40 for the user of the PT client B 40.

According to another example, the PT server 30 can consider other criteria in addition to PT box setting information to selectively route a PT session invitation to a PT box assigned to a target terminal.

As described above, in the present invention, a PT user or PT client performs a PT service setting in order to use a PT box service. As a result, information required for the PT service setting and a PT session establishment according to the information can effectively be provided.

Also, since the PT client (or PT UE) can predetermine or preset PT box setting information in order to use a PT box, the present invention can effectively provide a user-oriented PT box service.

In addition, the present invention provides one parameter (e.g., 'PT box routing') with three possible values in order to indicate (represent) the PT box setting information. Three parameters (e.g., 'PT box capability', 'PT box willingness' and 'PT box conditionality') can be represented using a single 'PT box routing' parameter.

Furthermore, the present provides various ways to set up and use the PT box. As a result, the present invention provides a technique of using the PT box that is convenient and effective, so that a user can access media data associated with a PT service at any later time desired by the user.

The present invention has been explained with reference to the embodiments which are merely exemplary. It will be apparent to those skilled in the art that various modifications and variations can be made in the present invention without departing from the spirit or scope of the invention. For example, each condition described in the examples of FIGS. 5 to 10 may be designated as one information of PT box setting information, to be implemented as a parameter having the designated information. It is intended that the present invention cover modifications and variations of this invention provided they come within the scope of the appended claims and their equivalents.

The invention claimed is:

1. A method of providing a Push-To (PT) box service to a terminal according to an Open Mobile Alliance (OMA) standard, comprising:
receiving from a second terminal, by a PT server that supports the PT box service according to the OMA standard, a SIP PUBLISH message that includes
four types of parameters including answer mode information, an incoming session barring flag, an instant personal alert barring flag, and a simultaneous support flag, and
PT box setting information indicating one among three conditions of 'unwillingness', 'unconditional' and 'conditional', which instructs how a session invitation should be routed to a PT box that stores data for a later access by the second terminal, the PT box residing in at least one among three locations comprising the first terminal, the second terminal, and the PT server;
receiving from a first terminal, by the PT server, a session invitation message directed to the second terminal;
determining, by the PT server, a routing of the session invitation message to the PT box for the second terminal based on at least the PT box setting information; and
forwarding, by the PT server, a 'fail' message to the first terminal if the PT box setting information is set to 'unwillingness',
wherein the condition of 'unwillingness' indicates that the PT box service is available for routing the session invitation message to the PT box but that a user of the second terminal has prohibited the routing of the session invitation message to the PT box,
wherein the condition of 'unconditional' indicates that the PT box service is available for routing the session invitation message to the PT box and that the user of the second terminal has allowed the routing of the session invitation message to the PT box without condition,
wherein the condition of 'conditional' indicates that the PT box service is available for routing the session invitation message to the PT box but that the user of the second terminal has allowed the routing of the session invitation message to the PT box only under a certain condition, and
wherein the PT Box setting information further includes a PT Box capability setting indicating whether or not the terminal is capable of using the PT box service and that is different than the PT box setting information indicating one among three conditions of 'unwillingness', 'unconditional' and 'conditional'.

2. The method of claim 1, further comprising:
forwarding, by the PT server, the session invitation message to the PT box if the PT box setting information is set to 'unconditional'.

3. The method of claim 1, further comprising:
forwarding, by the PT server, a 'fail' message to the first terminal if the PT box setting information is set to 'conditional' and the certain condition is not satisfied; and
establishing a PT session between the first terminal and the PT box associated with the second terminal and unconditionally routing the session invitation message to the PT box if the PT box setting information is set to 'conditional' and the certain condition is satisfied.

4. The method of claim 3, wherein the certain condition is:
(a) when the PT server does not receive a ringing response from the second terminal for certain time after the PT server sent the session invitation to the second terminal,
(b) when the PT server does not receive an invitation accept or reject response from the second terminal for certain time after the PT server received a ringing response from the second terminal, or
(c) when the PT server does not receive an invitation accept or reject response from the second terminal for certain time after the PT server sent the session invitation to the second terminal.

5. The method of claim 3, wherein the certain condition is when the second terminal is currently participating in another session and the second terminal does not support simultaneous sessions.

6. The method of claim 3, wherein the certain condition is when the PT server does not receive a TBCP acknowledgement response from the second terminal for certain time after the PT server sent a TBCP connect request to the second terminal.

7. A method for providing Push-To (PT) box setting information according to an Open Mobile Alliance (OPM) standard, comprising:
transmitting, by a first terminal that supports a PT box service according to the OMA standard, a session invitation message directed to a second terminal different from the first terminal, the second terminal, which also supports the PT box service according to the OMA standard, having established a PT box using a SIP PUBLISH message having four types of parameters including answer mode information, an incoming session barring flag, an instant personal alert barring flag, and a simultaneous support flag, and the SIP PUBLISH message including PT box setting information for a PT box service, the PT box setting information indicating one among three conditions of 'unwillingness', 'unconditional' and 'conditional', which instructs how a session invitation should be routed to the PT box that stores data for the second terminal,
wherein the PT box resides in at least one among three locations comprising the first terminal, the second terminal, and a PT server;
receiving, by the first terminal, a response message in response to the session invitation message; and
receiving, by the first terminal, a 'fail' message if the PT box setting information is set to 'unwillingness",
wherein the condition of 'unwillingness' indicates that the PT box service is available for routing the session invitation message to the PT box but that a user of the second terminal has prohibited the routing of the session invitation message to the PT box,
wherein the condition of 'unconditional' indicates that the PT box service is available for routing the session invitation message to the PT box and that the user of the second terminal has allowed the routing of the session invitation message to the PT box without condition, wherein the condition of 'conditional' indicates that the PT box service is available for routing the session invitation message to the PT box but that the user of the second terminal has allowed the routing of the session invitation message to the PT box only under a certain condition, and wherein the PT Box setting information further includes a PT Box capability setting indicating whether or not the second terminal is capable of using the PT box service and that is different than the PT box setting information indicating one among three conditions of 'unwillingness', 'unconditional' and 'conditional'.

8. The method of claim 7, wherein the transmitting step is performed during a PT service setting procedure.

9. The method of claim 7, further comprising:

establishing a PT session between the first terminal and the PT box associated with the second terminal and unconditionally routing the session invitation message to the PT box if the PT box setting information is set to 'unconditional'.

10. The method of claim 7, further comprising:

receiving, by the first terminal, a 'fail' message to the first terminal if the PT box setting information is set to 'conditional' and the certain condition is not satisfied; and establishing a PT session between the first terminal and the PT box associated with the second terminal and unconditionally routing the session invitation message to the PT box if the PT box setting information is set to 'conditional' and the certain condition is satisfied.

11. The method of claim 10, wherein the certain condition is:

(a) when the PT server does not receive a ringing response from the second terminal for certain time after the PT server sent the session invitation to the second terminal, (b) when the PT server does not receive an invitation accept or reject response from the second terminal for certain time after the PT server received a ringing response from the second terminal, or (c) when the PT server does not receive an invitation accept or reject response from the second terminal for certain time after the PT server sent the session invitation to the second terminal.

12. The method of claim 10, wherein the certain condition is when the second terminal is currently participating in another session and the second terminal does not support simultaneous sessions.

13. The method of claim 10, wherein the certain condition is when the PT server does not receive a TBCP acknowledgement response from the second terminal for certain time after the PT server sent a TBCP connect request to the second terminal.

* * * * *